Oct. 20, 1953     J. L. HUTTON     2,656,098
SUPPORT FOR COMPUTING MACHINES AND THE LIKE

Filed Feb. 2, 1949     2 Sheets-Sheet 1

Inventor
JAMES L. HUTTON

By

ATTORNEY

Oct. 20, 1953         J. L. HUTTON         2,656,098
SUPPORT FOR COMPUTING MACHINES AND THE LIKE

Filed Feb. 2, 1949         2 Sheets-Sheet 2

Inventor
JAMES L. HUTTON

ATTORNEY

Patented Oct. 20, 1953

2,656,098

UNITED STATES PATENT OFFICE 2,656,098

SUPPORT FOR COMPUTING MACHINES AND THE LIKE

James L. Hutton, Greensboro, N. C.

Application February 2, 1949, Serial No. 74,107

5 Claims. (Cl. 235—1)

This invention relates to supports, and more particularly to a support adapted to be employed in conjunction with computing machines.

A principal object of the invention is to provide a novel and improved support for computing machines which is simple in construction, compact in size, and which enables a computing machine to be held in such a manner that its keyboard will be elevated and inclined at a very efficient and comfortable operating angle with respect to the operator.

A further object of the invention is to provide an improved support for computing machines adapted to be employed on a desk or table, said support permitting the space on the desk or table to be utilized to maximum advantage by substantially eliminating the obstruction of the desk or table originally caused by the placement of the machine thereon, the base member thereof affording an opening for the reception of books, pads or other accounting material.

Another object of the invention is to provide an improved support for computing machines embodying readily available means for permanently recording the results of the computations obtained from the machines.

Another object of the invention is to provide an improved support for a computing machine adapted to be placed on a desk or table and occupying only a small amount of space thereon, the support being so arranged that the operator may record computed results on a large size sheet directly in front of the machine by slipping said sheet under the machine, thereby allowing the operator to compute and record the desired results without shifting his position with respect to the desk, table, or machine.

Another object is to provide an improved apparatus for efficiently computing and recording figures, said apparatus reducing the amount of fatigue involved, enabling the operator to work in a comfortable position, and increasing the operator's rate of work.

Another object of the invention is to provide an improved support for computing machines embodying convenient means for recording computed results, said means being easy to manipulate and being within easy reach of the operator at all times.

Still another object of the invention is to provide an improved computing machine mounting formed and arranged to allow a large size sheet of paper to be slipped under the machine and to cause said sheet to be doubled up on itself or rolled up as it is fed into the mounting, whereby the amount of desk space taken up is minimized, and whereby the operator is enabled to record computed results on any part of said sheet and still remain in a comfortable and efficient working position with respect to the machine.

Still a further object of the invention is to provide an improved support for a computing machine wherein means is provided for supporting or attaching a secondary machine, such as an adding machine, to be used in conjunction with the principal machine, said support being arranged so that the controls of the secondary machine will be located in such a position as to conform with the location of the controls of the principal machine and to provide maximum accessibility to the controls, and ease of operation of both machines.

Additional objects and advantages of the invention will become apparent from the following description and claims, and from the accompanying drawings, wherein Figure 1 is a top plan view of a computing machine support constructed in accordance with the present invention.

Figure 1:
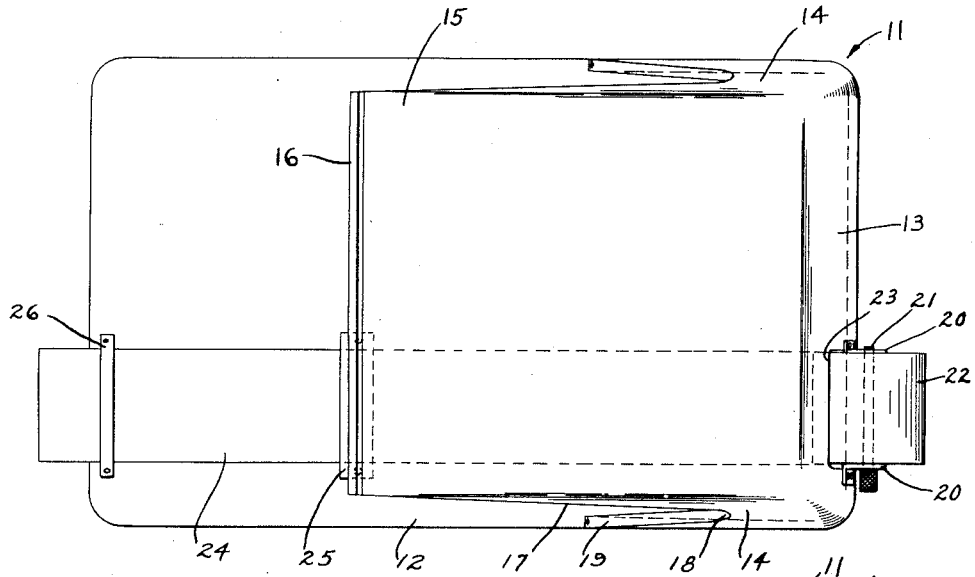
Figure 2:
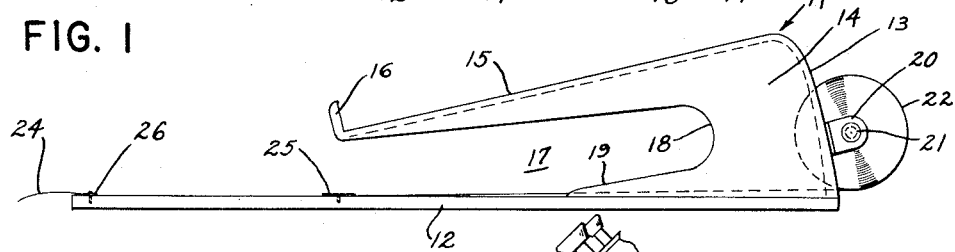
Figure 2 is a side elevational view of the support shown in Figure 1.
Figure 3:
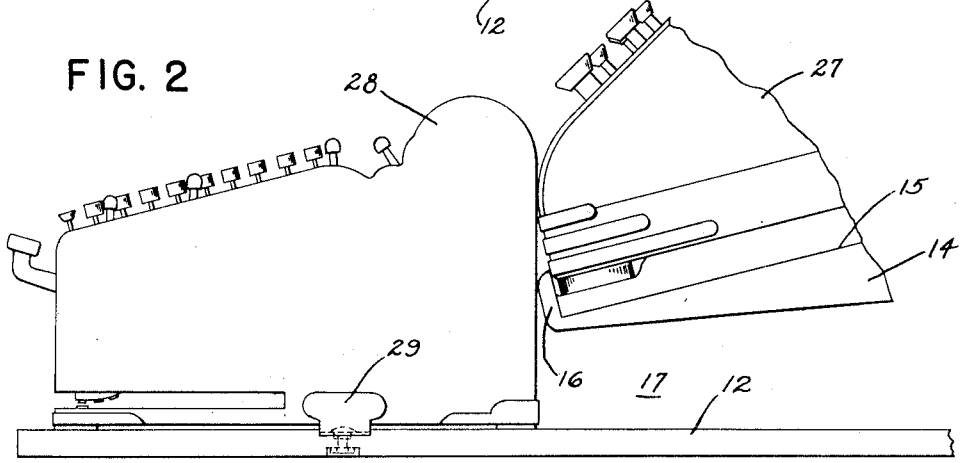
Figure 3 is an enlarged fragmentary side elevational view, showing a secondary machine, such as an adding machine, attached to the forward section of the support of Figure 1, and showing a portion of the principal computing machine resting on the rear portion of the support in operating position.

Referring to the drawings, and more particularly to Figures 1 to 3, the support may comprise an integral casting 11 having a generally rectangular, separate flat base portion 12 affixed thereto by means of screws from the bottom, the screws not being shown. The body portion 11 is formed at its rear portion with an upwardly and inwardly inclined transverse rear wall 13 and upwardly and inwardly inclined side wall elements 14, 14, merging with a downwardly and forwardly inclined top supporting surface 15. As shown in Figures 1 and 2, the surface 15 overlies the rear portion of base 12 and is formed at its forward margin with an upwardly extending lip or flange 16 which serves as a stop member for a computing machine mounted on the surface 15, as will be subsequently described. The side wall elements 14, 14 are formed with enlarged forwardly opening inclined slots 17 having rounded rear edge portions 18, the lower edge portions of the slots 17 being upwardly inclined rearwardly at a relatively small angle with respect to base 12, as shown at 19. Secured to rear wall 13, preferably adjacent one side wall element 14, are a pair of brackets 20, 20, which may be of springy material, carrying a removable transverse shaft 21. Mounted on shaft 21 is a roll of paper 22. Adjacent roll 22 the rear wall 13 is formed near its bottom margin with a horizontal slot 23. The paper strip on roll 22 passes forwardly through slot 23 over the base member 12, as shown at 24, the said base member having secured thereto at 25 a transverse guide strap under which the paper strip passes. Another transverse guide strap 26 is secured thereto adjacent its forward margin, beneath which said strip also passes. The straps 25 and 26 exert light frictional pressure on the paper strip and hold the strip against the base member 12, whereby notations may be made on said paper strip in the space between the straps 25 and 26, the base member serving as a smooth backing for the portion of the strip on which the notations are made. When it is desired to remove the portion of the strip 24 on which the notations have been made, the strip is pulled forwardly, causing roll 22 to unwind. The inscribed portion of the strip is then torn off, using the forward edge of strap 26 as a knife edge. This provides a clean strip section between straps 25 and 26 for the next set of notations.

In operation, a computing machine, such as shown at 27 in Figure 3, is mounted on the inclined surface 15, the lip 16 acting as a stop means for holding the machine 27 against slipping downwardly and forwardly. A secondary machine, such as a small adding machine, 28, may be mounted on the forward portion of the base 12 and held thereon by suitable brackets or clamps 29, in the manner illustrated in Figure 3.

From Figure 3, it will be seen that the principal machine 27 is supported in an elevated and inclined position rearwardly of the secondary machine 28 so that the keyboard of the secondary machine 28 forms substantially a forward extension of the keyboard of the principal machine 27. The inclined position of the principal machine makes it easy for the operator to manipulate the keys of both machines with equal facility and with normal hand and arm movements.

Actually, by means of this support, the keyboard of the principal machine is brought closer to the operator with the keys more easily available than when the machine was supported by the conventional table or desk.

In the employment of the support, with a computing machine resting thereon, a ledger or other accounting sheet may be placed on the forward portion of the base 12, the advancing edge of the sheet entering the slots 17 in the side walls 14, 14. As more and more entries are made on the sheet, it is pushed further and further into the slots 17 until the advancing edge thereof encounters the rounded slot end portions 18. Further advancement of the sheet causes the advancing marginal portion of the sheet to curl upwardly and to be rolled up or doubled up on itself at the end portions of the slots 17. This affords the decided advantage of permitting entries to be made over the full area of the sheet without requiring the operator to remove the sheet or to shift or otherwise change his normal working position. It will be further evident that by automatically curling up the advancing portion of the sheet as the work progresses, the amount of desk or table space required for making entries from the computing machine on a ledger or other accounting sheet is reduced to a minimum.

It will be further apparent that the support may be employed to mount a single computing machine on the wall member 15, the data obtained therefrom being recorded on the paper strip 24 in the manner previously described. If two machines are used in the manner described, the strip of paper may be drawn out in front of the secondary machine and used to advantage.

Figure 4:
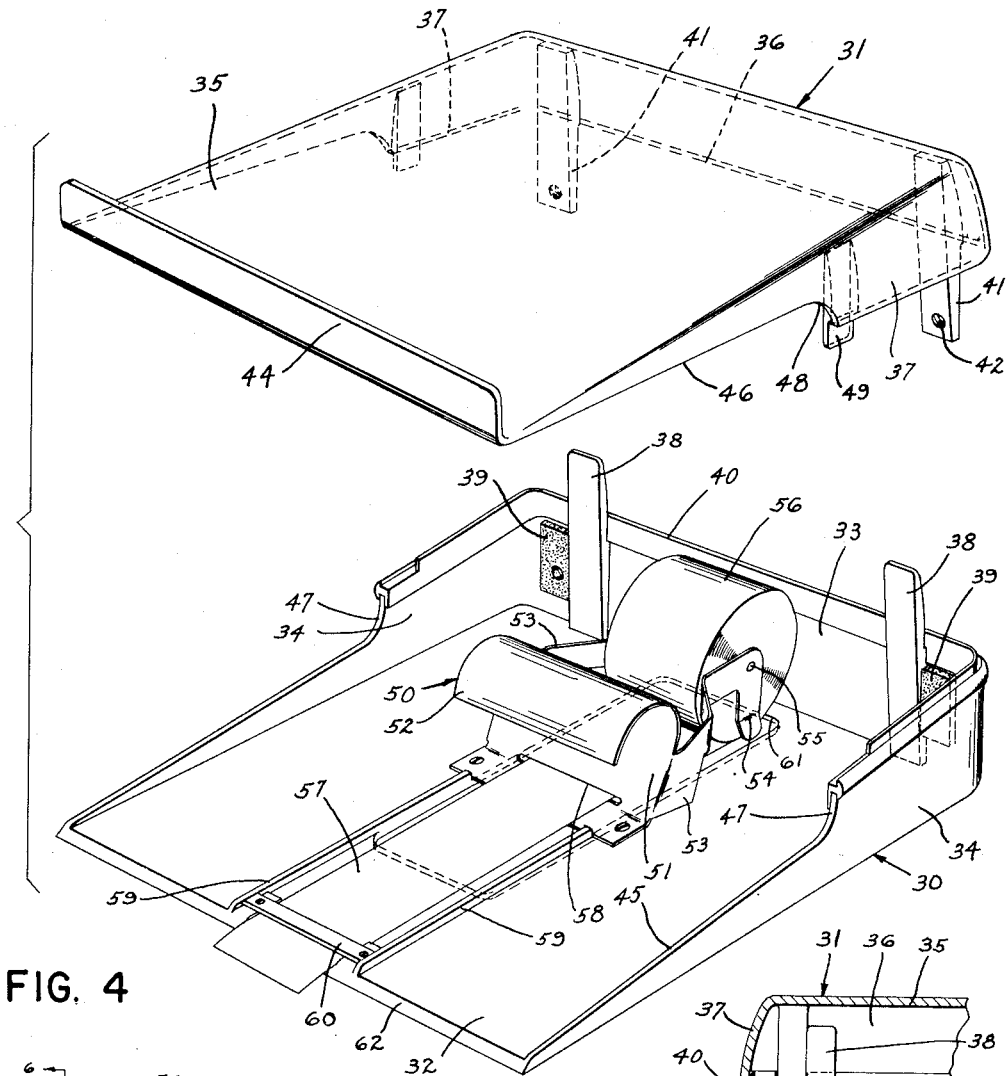
Figure 4 is a perspective expanded view showing the components of a modified form of computing machine support constructed in accordance with the present invention.
Figure 5:
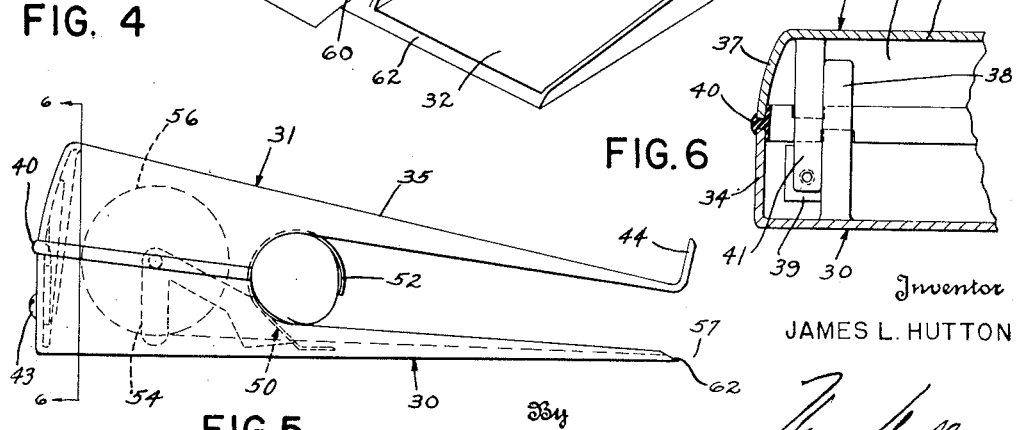
Figure 5 is a side elevational view of the machine support of Figure 4, showing a sheet of paper partially curled up therein.
Figure 6:
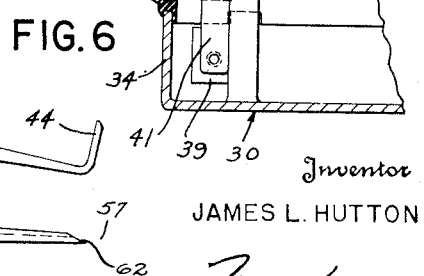
Figure 6 is a fragmentary, cross sectional view taken on line 6—6 of Figure 5.

Referring now to Figures 4 to 6, a modified form of the invention is disclosed comprising a lower housing section 30 to which is secured an upper support section 31. Lower section 30 comprises a base wall 32 having upwardly extending transverse rear wall 33 and side wall elements 34, 34. Upper section 31 comprises a flat inclined top surface 35 having downwardly projecting rear wall 36 and side wall elements 37, 37. Integrally formed with the rear wall 33 of bottom section 30 are the upwardly extending flat tapered fingers 38, 38, as shown in Figure 4, said fingers projecting upwardly from the inside surface of rear wall 33. Secured to said inside surface outwardly of and adjacent the respective fingers 38, 38 are cushioning pads 39, 39, or rubber or other suitable resilient material. Fixed to the top edges of the side wall element 34 and rear wall 33 is a resilient cushioning strip 40 of rubber or the like, said strip being suitably channelled top and bottom to receive the top and bottom edges of the lower and upper sections, respectively. The rear wall 36 of said upper section is formed with downwardly extending flat tapered fingers 41, 41 receivable in the lower section outwardly of and adjacent the fingers 38, 38, as shown in Figure 6, and engageable on the respective cushioning pads 39, 39. The lower portions of fingers 41, 41 are formed with tapped openings 42. Screws 43 are passed through wall 33 and pads 39 and are threadedly engaged in the tapped openings 42, whereby the upper section 31 is secured to the lower section 30, as shown in Figure 5.

Inclined top surface 35 is formed at its forward margin with an upwardly extending lip or flange 44 which functions as a stop means for preventing forward and downward slipping of a machine mounted on said top surface. The side walls of the elements 30 and 31 are cut away, as shown at 45 and 46 to define forwardly open, upwardly and rearwardly inclined side slots. Said cut away portions terminate in mating arcuate end sections 47 and 48 which define rounded slot ends for guiding the advancing edge of a paper sheet into curling position as the sheet is pushed inwardly. The side walls 37 are formed with guide lugs 49 rearwardly of and adjacent the arcuate sections 48, said lugs being engaged with the cushioning strip 40 and extending inwardly adjacent thereto when the upper section 31 is secured to lower section 30 as previously described.

Secured to the rear portion of base wall 32 is a bracket member 50, formed of sheet metal or the like, having an upwardly extending transverse body portion 51 formed at its top portion with a forwardly and downwardly curved guide flap 52, and with rearwardly bent side wings 53, 53. The body portion 51 is transversely aligned with the curved cut away end portions 47, 47. Side wings 53 are formed with resilient bracket fingers 54 carrying opposing pins 55. Rotatably engaged by the pins 55 is the spool having a paper roll 56. The paper strip, shown at 57, passes through a horizontal slot 58 formed in the lower portion of body 51 and thence between parallel ribs 59, 59 formed on base wall 32. Secured to said base wall transversely between the ribs 59, 59, adjacent the forward edge of the base wall is a strap member 60 beneath which the paper strip 57 passes. Strap member 60 overlies the paper strip with light frictional pressure. Said strap member may be employed as a knife edge for tearing off the forward end portion of the paper strip as desired.

The base wall member 32 is formed with an aperture 61 of substantial size underlying the roll 56 and the spring fingers 54, and providing access to said roll and spring fingers, thereby permitting an empty spool to be removed and a new roll of paper to be inserted between the spring fingers when required.

The aperture 61 extends forwardly a substantial distance beyond the bracket member 50, enabling the operator to thread the paper strip through the slot 58 and to a forward position wherein it may be slipped beneath the strap member 60. This enables the operator to replace the paper roll without detaching the upper section 31 from the lower section 30.

This modified form of the invention is used in the same manner as described in connection with Figures 1, 2 and 3. In the present embodiment, however, the curling of a sheet inserted into the slots is aided by the centrally disposed guide member 52, and the use of this guide member is particularly advantageous when narrow width sheets are used.

The surface 15 of the form of the invention shown in Figures 1 to 3, and the surface 35 of the form shown in Figures 4 to 6 may be at any desired angle to the horizontal. A preferred value of this angle has been found to be approximately 12°. Other suitable angles may be employed within the spirit of the present invention.

In the form of the invention shown in Figures 4 to 6, the strip 40 and the pads 39, 39 provide a shock absorbing action which insulates the table or desk on which the device is mounted against vibrations caused by the operation of the computing machine.

It will be apparent that the device of the present invention is not limited in the manner of its use, as sheets, books, pads or cards may be inserted under the supporting surface which accommodates them while the machine supported thereby is in use.

The base plate may be made so as to extend any desired distance forwardly of the computing machine and may be employed as an arm rest for the operator while copying computed data. With an arrangement such as described herein, an operator may operate the machine and record the results with a minimum of body and arm movement, thereby eliminating a substantial amount of unnecessary motion and fatigue for the operator, and providing a considerable saving in labor.

While certain specific embodiments of a machine supporting device have been disclosed in the foregoing description, it will be understood that various modifications within the spirit of the invention may occur to those skilled in the art. Therefore, it is intended that no limitations be placed on the invention except as defined by the appended claims.

I claim as my invention:

1. A support device for computing machines comprising a base member formed at its rear and side portions with upwardly extending wall elements, a supporting surface formed with rear and side downwardly extending wall elements registrable with the upwardly extending wall elements, a plurality of upwardly extending lugs carried by the rear wall element of the base member at its inner surface, cushioning pads carried by said inner surface adjacent said lugs, downwardly extending lugs carried by the rear wall element of the supporting surface and engageable with said cushioning pads, said downwardly projecting lugs interlocking with said upwardly extending lugs to restrain the supporting surface against horizontal movement with respect to the base member, means securing the lugs of the supporting member to the rear wall of the base member, and a resilient cushioning strip interposed between the meeting edges of the wall elements, the supporting surface being inclined upwardly and rearwardly with respect to the bottom of the base member, and being provided with an upwardly projecting lip adjacent its forward margin.

2. The structure of claim 1, wherein the side wall elements are cut away to define forwardly open side slots when the supporting surface is secured in superimposed relation to the base member.

3. A support for computing machines and the like comprising a base section formed at its rear and side portions with upwardly extending wall elements, a supporting section formed with rear and side downwardly extending wall elements registrable with the upwardly extending wall elements of said base section, a plurality of upwardly extending lugs on the rear wall element of said base section and downwardly projecting lugs on each side wall element of said supporting section for aligning the registrable wall elements of said section, a resilient cushioning strip interposed between the registering edges of said wall elements, means for securing said aligned sections and interposed cushioning strip in assembled relation, and a supporting surface for a computing machine or the like formed by the top face of said supporting section, said supporting surface being inclined downwardly toward its forward free edge and having an upwardly projecting lip adjacent said forward edge.

4. A support for computing machines and the like comprising a base section and an associated supporting section having rear and side wall elements disposing said supporting section in overlying spaced relation above said base section with the top face of said supporting section inclined downwardly toward its forward edge and formed with an upwardly extending lip adjacent said forward edge, whereby said top face is adapted as a supporting surface for computing machines and the like, and said side wall elements being cut away to define forwardly opening slots reaching rearwardly beneath said supporting section and having arcuate end portions, whereby reference sheets may be extended beneath said supporting section during use of a computing machine or the like disposed on said supporting surface and the top edges of said reference sheets may be curled back upon the sheets by the arcuate end portions of said slots to allow extension of said sheets sufficiently beneath said supporting section for reference to the bottom portions of said sheets conveniently at said computing machine.

5. A support for computing machines and the like comprising a base section and an associated supporting section having rear and side wall elements disposing said supporting section in overlying spaced relation above said base section with the top face of said supporting section inclined downwardly toward its forward edge and formed with an upwardly extending lip adjacent said forward edge, and said side wall elements being cut away to define forwardly opening slots reaching rearwardly beneath said supporting section for a major portion of the distance from said forward edge to the rear of said section, said slots being of substantial width and being formed arcuately at their closed ends, whereby the top face of said supporting section is adapted as a supporting surface for a computing machine or the like and said slots provide for extending reference sheets beneath said supporting section during use of a computing machine or the like disposed on said supporting surface with the arcuately formed closed ends of said slots serving to curl the top edges of said reference sheets beneath said supporting section for maximum extension of the sheets thereunder.

JAMES L. HUTTON.

References Cited in the file of this patent

UNITED STATES PATENTS

| Number | Name | Date |
|---|---|---|
| 514,538 | Ball | Feb. 13, 1894 |
| 1,372,169 | Guth | Mar. 22, 1921 |
| 1,381,903 | Burns | June 21, 1921 |
| 1,694,868 | Sawyer | Dec. 11, 1928 |
| 1,809,603 | Reed | June 9, 1931 |
| 2,047,359 | Dayment et al. | July 14, 1936 |
| 2,248,486 | Birk | July 8, 1941 |
| 2,306,209 | Elofson et al. | Dec. 22, 1942 |
| 2,363,811 | Shearston | Nov. 28, 1944 |
| 2,466,825 | Rollman | Apr. 12, 1949 |
| 2,473,731 | Shepard, Sr. | June 21, 1949 |